United States Patent [19]

Kobunaya

[11] Patent Number: 5,537,375
[45] Date of Patent: Jul. 16, 1996

[54] OPTICAL INFORMATION CONTROL DEVICE AND SYNCHRONIZING METHOD THEREOF

[75] Inventor: Hideki Kobunaya, Tokyo, Japan

[73] Assignee: NEC Corporation, Tokyo, Japan

[21] Appl. No.: 275,105

[22] Filed: Jul. 14, 1994

[30] Foreign Application Priority Data

Jul. 14, 1993 [JP] Japan ..................................... 5-195620

[51] Int. Cl.$^6$ ...................................................... G11B 7/00
[52] U.S. Cl. ................... 369/48; 369/50; 369/58; 369/59; 369/124
[58] Field of Search .................... 369/47, 48, 49, 369/50, 53, 54, 58, 59, 60, 124, 32, 275.3, 25.4

[56] References Cited

U.S. PATENT DOCUMENTS 5,459,710  10/1995  Hoshino et al. ..................... 369/275.3

FOREIGN PATENT DOCUMENTS 1-251371  10/1989  Japan .
3-157874   7/1991  Japan .

Primary Examiner—Georgia Y. Epps
Assistant Examiner—Muhammad Edun
Attorney, Agent, or Firm—Whitham, Curtis, Whitham & McGinn

[57] ABSTRACT

An optical information control device and synchronizing method therefor include a mark detection circuit for detecting marks recorded at even intervals in a track on an optical disk and outputting a mark detection signal indicating a detected mark; a frequency dividing circuit for generating a reference clock by frequency-dividing a pit clock and stopping an operation thereof when having received the mark detection signal; and a resumption circuit for resuming the frequency dividing circuit after a preset time from reception of the mark detection signal. Moreover, the reference clock may be synchronized to a byte boundary of data recorded on the optical disk by stopping generation of the reference clock for a preset time.

19 Claims, 15 Drawing Sheets

FIG.13

SELECTOR 46

| Lower 4-bit 32 | SIGNAL a |
|---|---|
| 0000H | C15 |
| 0001H | C14 |
| 0010H | C13 |
| 0011H | C12 |
| 0100H | C11 |
| 0101H | C10 |
| 0110H | C9 |
| 0111H | C8 |
| 1000H | C7 |
| 1001H | C6 |
| 1010H | C5 |
| 1011H | C4 |
| 1100H | C3 |
| 1101H | C2 |
| 1110H | C1 |
| 1111H | C0 |

SELECTOR 47

| Lower 4-bit 32 | SIGNAL b |
|---|---|
| 0000H | C0 |
| 0001H | C1 |
| 0010H | C2 |
| 0011H | C3 |
| 0100H | C4 |
| 0101H | C5 |
| 0110H | C6 |
| 0111H | C7 |
| 1000H | C8 |
| 1001H | C9 |
| 1010H | C10 |
| 1011H | C11 |
| 1100H | C12 |
| 1101H | C13 |
| 1110H | C14 |
| 1111H | C15 |

OPTICAL INFORMATION CONTROL DEVICE AND SYNCHRONIZING METHOD THEREOF

BACKGROUND OF THE INVENTION

The present invention relates to an optical information control device for recording information on an optical disk and replaying information recorded on an optical disk.

First of all, a prior optical information control device is explained.

FIG. 14 is a block diagram of a prior optical information control device.

In FIG. 14, 1 is an optical disk.

2 is an optical head.

3 is a head amp.

4 is a waveform shaping circuit.

5 is a laser driver circuit.

6 is a decoder.

7 is an encoder.

8 is a format control section.

9 is a buffer.

10 is an error correction circuit.

11 is a SCSI control section.

12 is an internal bus.

13 is a SCSI bus.

14 is the host computer.

15 is an actuator.

16 is a servo-circuit.

17 is a PLL (Phased Locked Loop).

18 is an error detection circuit.

19 is a mark detection circuit.

20 is a lock signal that is a completion signal of PLL synchronization.

21 is a clock (rdclk) synchronized to optical disk data.

211 is a crystal oscillator.

22 is a clock (rfclk) output from the crystal oscillator 211.

23 is an address mark detection signal.

24 is a sector mark detection signal.

52 is an output enable circuit for making an output from the mark detection circuit 19 enabled.

213 is a selector for switching over the rdclk 21 and the rfclk 22 by the lock signal 20.

57 is an output (chclk) from the selector 213.

208 is a 16-frequency divider that outputs a byte clock BCLK.

203 is a counter.

201 and 210 are registers for holding values loaded into the counter 203.

202 and 209 are registers for holding values to become the object of comparison to output from the counter 203.

204 and 207 are zero detector circuits.

205 is a comparison circuit.

206 is a counter.

212 is a logical sum.

214 is a window signal.

215 is a selector that selects values to be loaded into the counter 203.

216 is a selector for selecting values to become the object of comparison to the counter 203.

217 is a window central signal.

218 is an RS flip-flop.

Next, operation of an optical information control device configured by above components is explained.

First, the sector format of an optical disk is explained.

FIG. 4 shows the sector format of an optical disk.

In this figure, SM is a 5-byte sector mark indicating beginning location of the sector.

VFO is a Variable Frequency Oscillator, where VFO1 is of 12-byte, VFO2 is of 8-byte, VFO3 is of 12-byte.

AM is an address mark. There are three AM's in a sector.

Each of ID1–ID3 is a 5-byte identification code, configured by a two-byte truck number, a 1-byte sector number, and a 2-byte error detection code CRC.

PA is a postamble of 1-byte.

ODF is an off-set detection flag that is an offset correction mirror surface for servo.

GAP is a gap, each gap is of 3-byte.

FLAG is a 5-byte flag.

ALPC is a 2-byte, used for a laser power test, etc.

SYNC is a 3-byte synchronous code.

DATA is a data area including CRC and ECC.

A sector comprises the sector mark SM, VFO1, VFO2, VFO3, three address mark AM's, identification codes ID1–ID3, a postamble PA, off-set detection flag ODF, two gaps GAPs, flag FLGs, ALPC, a synchronous code SYNC and a data area DATA.

In addition, one byte of these marks, data, etc. consists of 16 01 pits. For example, the pit pattern of address mark AM is 0100100000000100.

In FIG. 14, operation of the servo system of the optical disk having such sector format.

A laser beam output from the optical head 2 is reflected by the optical disk 1.

This reflected beam is transmitted to the error detection circuit 18 via the head amp 3.

The error detection circuit 18 detects slippage between the optical head 2 and a track on the optical disk 1 using the reflected beam.

The servo circuit 16 generates a control signal for the actuator 15 based on the detected slippage and determines location of the optical head 2 by controlling the actuator 15.

Next, by read operation of the optical disk drive, data on the optical disk 1 is read in via the optical head 2 and the head amp 3.

The waveform of the data read in is shaped at the waveform shaping circuit 4, and the data is transferred to the decoder 6.

The output of decoder 6 is transferred to the format control section 8.

The format control section 8 reads ID1–ID3 that were decoded at the decoder 6 and detects a sector indicating beginning of data processing.

When the objective sector is detected, the read data processing of the target sector's data begins.

The data is processed error check an error correction at the error correction circuit 10 and is transferred to the buffer 9.

Then this data is transferred to the host computer 14 by the SCSI control section via the SCSI bus 13.

At this time, at the format control section 8, reading of ID1–ID3 is conducted by the address mark detection signal 23 as a trigger, which is a detection signal for the address mark AM located before ID1–ID3.

The re-setting of the decoder 6 is also triggered by the address mark detector signal 23.

The rdclk 21, a synchronous signal generated at the PLL 17 on the basis of patterns of VFO1–VFO3 output from the waveform shaping circuit 4 is used as the decoder read clock.

Moreover, there is a method as described in Japanese Patent Laid-Open No. 251371 (1989) of generating a read clock by inputting an intensity signal for tracking-servo from an optical head.

Next, how to detect the address mark AM is explained in detail.

Detection of the address mark AM is conducted by pattern matching, etc. in the mark detection circuit 19.

However, because pattern length of the address mark AM is only 1 byte, sometimes patterns from areas other than the address mark AM are mistakenly detected.

Therefore, the window signal 214, which enables detection of mark signals only for a certain period, is used to generate the address mark detection signal 23.

Following is an explanation of the generation of window signal 214 and address mark detection signal 23, in accordance with FIG. 14 and 15.

Where, the first window signal 214 that is generated has a window width of ±2 bytes and that of the second signal is ±1 byte.

For this reason, the registers 202 and 209 are set to "2" and "1" respectively.

The counters 203 and 206 are used to generate the window signal 214. These counters are operated by the byte clock BCLK.

The byte clock BCLK is generated by dividing the chclk 57 to 16-division at the 16-frequency divider 208. Basically, it is synchronized with each data byte.

When synchronization at PLL is established, the chclk 57 is the clock rdclk 21, which is in synchronization with the pits of data (16 pits =1 byte). When synchronization is not established, it becomes the clock rfclk 22 output from the crystal oscillator 211.

Using the patterns output from the waveform shaping circuit 4, the sector mark detection circuit 19 comprising pattern matching circuits, etc. detects the sector mark SM and output the sector mark detection signal 24.

Using the sector mark detection signal 24, the selector 215 selects the register 201.

The counter 203 loads the value (=12) stored in the resistor 201 starts down-counting by the byte clock BCLK as shown in FIG. 15.

At this time, the selector 216 selects the register 202 and outputs "2".

The set signal (A) is output by the comparison circuit 205 when the value from the counter 203 is smaller 1 than output (=2) from the selector 216, that is, when the value of the counter 203 becomes 1.

Then, the window signal 214 becomes active at a rising edge of the set signal (A).

On the other hand, when an output of the counter 203 becomes "0", the output "2" of the selector 216 is loaded into the counter 206 and the counter 206 downcounts.

And, when the value of counter 206 becomes "0," the reset signal (B) is generated.

At a rising edge of the reset signal (B), the window signal 214 becomes inactive.

When output of the counter 203 becomes "0," the window central signal 217 is generated.

During the period when the window signal 214 is active, the window central signal 217 is used in place of the mark detection signal when the address mark AM was not detected.

During the period when the window signal 214 is active, the address mark detection signal 23 is output from the output enable circuit 52 when the address mark AM is detected.

In the generation of the second window signal, the value (=13) stored in the register 210 is loaded into the counter 203 by the address mark detection signal 23 and the counter 203 down-counts.

Then the register 209 is selected and, because "1" is output from the selector 216 when the value of counter 203 becomes "0" the set signal (A) and the central window signal 217 are output.

Also, "1" is loaded into the counter 206, and when the value of counter 206 becomes "0", the reset signal (B) is output.

Then, the window signal 214 is created by the set signal (A) and the reset signal (B).

With the above-mentioned prior optical information control device, when synchronization of 01 bit data read out from the disk and rdclk read clock is lost, synchronization of the byte clock BCLK and the byte data is lost.

Therefore, the center of the window signal slips in pit units in relation to actual AM position.

Once a window signal slips out of synchronization, this slippage is propagated. This influences window signal detection of the next address mark.

When the slippage becomes great, the address mark AM ceases to exist at locations at which window signals become active, and the address mark detection signals stop being output.

Location slippage of the window central signal becomes a great problem when the window central signal is used in place of a mark detection signal as a reset signal for decoder or a trigger signal for ID reading.

Also, there is an art to solve this problem as described in Japanese Patent Laid-Open No. 157874 (1991). However, this is not a complete solution because it can not correct the phase of read clock.

Furthermore, in the above-mentioned example of a prior optical information control device, the window location or window width setting cannot be determined using pit units. It is possible to temporarily activate the counter by the clock synchronized to the pit data instead of byte clock BCLK and set a pit units value to register, but the value of the data being used would then be increased 16-fold.

Therefore, the register bit width, the counter bit width and the width of the signal line transmitting these output signals increases 4-fold, so the hardware increases.

SUMMARY OF THE INVENTION

It is an object of the present invention to provide an optical information control device enabling to prevent synchronization slippage by synchronizing a reference clock boundary with a data byte boundary and to surely restrain propagation of the slippage of window signals.

Another object of the present invention is to provide an optical information control device enabling to adjust generation of a window signal in pit units.

The objects of the present invention is achieved by an optical information control device comprising: a mark detection means for detecting marks recorded at even intervals in recording tracks of an optical disk and outputting a mark detection signal; and a reference clock generation means for stopping generation of the reference clock when having received the mark detection signal and re-generating the reference clock after preset time from stoppage of generation of the reference clock, then synchronizing the reference clock with byte boundaries of data recorded on the optical disk.

Moreover, the objects of the present invention is achieved by an optical information control device comprising: a mark detection means for detecting a mark recorded at even intervals in a recording track on an optical disk and generating a mark detection signal; a clock generation means for generating a preset multi-phase clock synchronized to the reference clock and the pit clock using the pit clock, stopping generation of the multi-phase clock and the reference clock when having received the mark detection signal, resuming generation of the multi-phase clock and the reference clock after pre-set time from the stoppage of generation, and synchronizing the phase of the reference clock to byte boundary of the data recorded on the optical disk and synchronizing the multi-phase clock to pits on the optical disk; and a window signal generation means for adjusting generation of a window signal that makes the mark detection signal enable in pit units using the multi-phase clock and the reference clock.

In the optical information control device by the present invention, a reference clock generation means generates a byte clock that works as a reference clock when reading data. With this, the clock generation means is stopped when a mark has been detected, pit clocks are counted during the stoppage, the clock generation means is resumed when the counted number has reached to a preset number. Then the reference clock is generated again so as to be synchronized to a byte boundary of the data.

With this operation, the reference clock synchronizes to the byte boundary of the data at each detection of the mark, so that slippage of synchronization can be controlled.

Moreover, the present invention having a clock generation means for generating a multi-phase clock synchronizing to a pit clock enables setting window width in pit units and easily generating a desired window.

BRIEF DESCRIPTION OF DRAWINGS

FIG. 13 shows tables relationships between input and output of selectors 46 and 47.

DETAILED DESCRIPTION OF THE PREFERRED EMBODIMENT

The embodiments of the present invention is explained in detail below.

Figure 1:
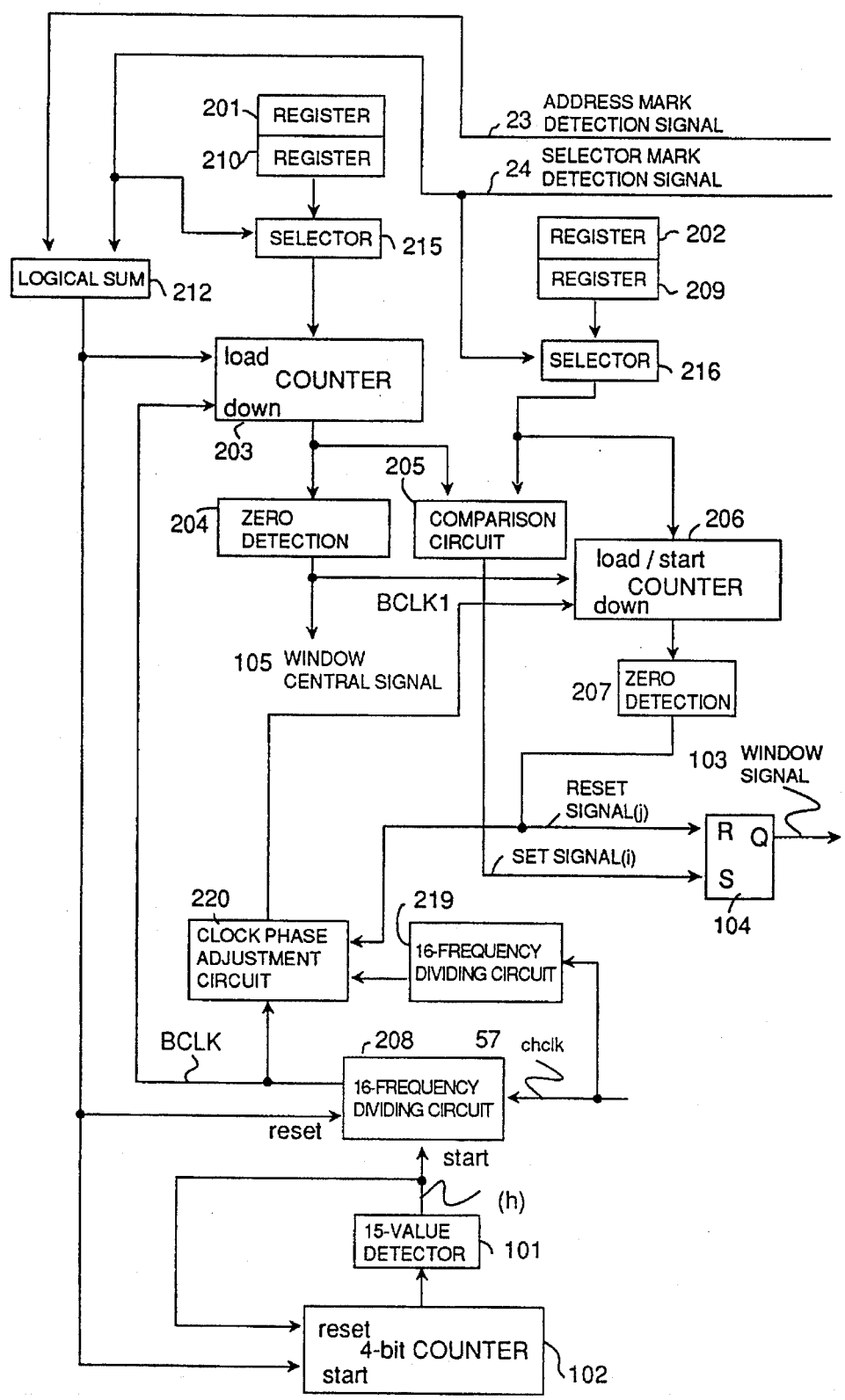
FIG. 1 is a block diagram of the first embodiment of the optical information control device by the present invention.
Figure 14:
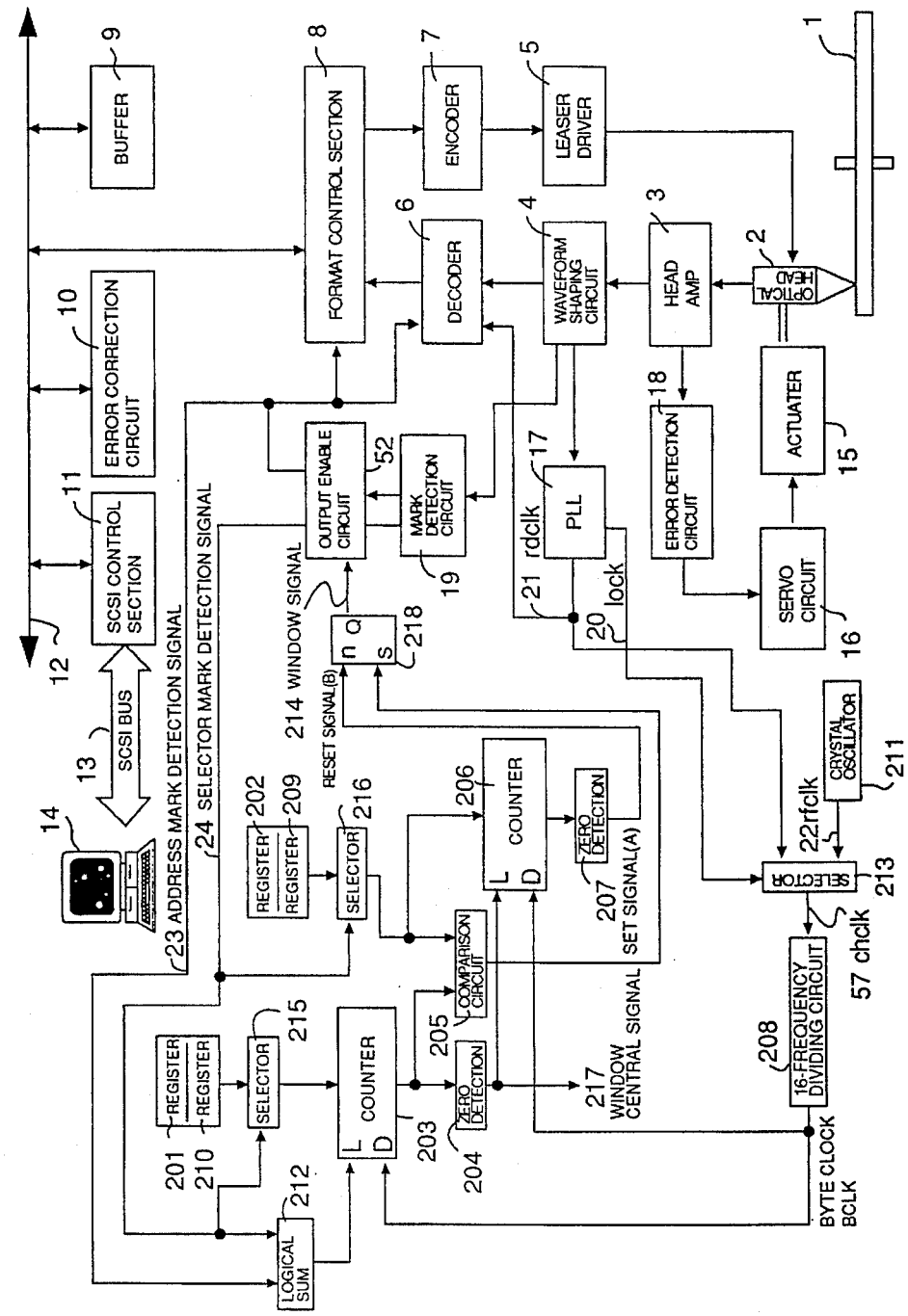
FIG. 14 is a block diagram of a prior optical information control device.
Figure 15:
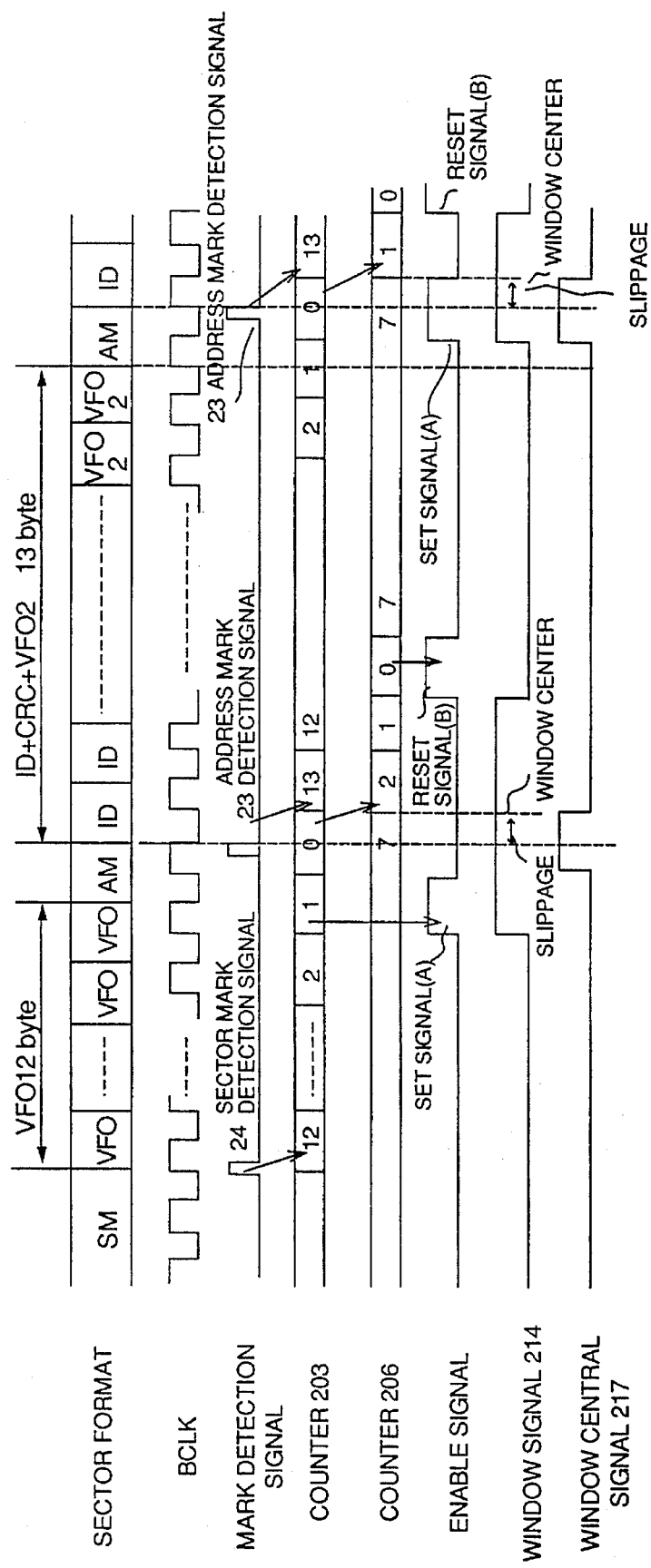
FIG. 15 is a timing chart showing an operation of an example of prior art.

FIG. 1 is a block diagram of the first embodiment of the optical information control device by the present invention. Where, reference numbers that correspond to the basic elements of the prior art example in FIG. 14 are given.

In FIG. 1, 23 is an address mark detection signal that is output from the output enable circuit 52.

24 is a sector mark detection signal that is output from the output enable circuit 52.

57 is a chclk that is output from the selector 213.

101 is a 15-value detector.

102 is a 4-bit counter.

103 is a window signal that is supplied to the output enable circuit 52.

104 is an RS flip-flop.

105 is a window central signal.

203 is a counter.

201 and 210 are registers that hold values to be loaded into the counter 203.

202 and 209 are registers that hold values to become objectives for comparison with outputs from the counter 203.

204 and 207 are zero detection circuits.

205 is a comparison circuit.

206 is a counter.

208 is a 16-frequency divider that outputs a byte clock BCLK.

212 is a logical sum.

215 is a selector that selects a value to be loaded into the counter 203.

216 is a selector that selects a value to become an objective for comparison with an output from the counter 203.

219 is a 16-frequency divider.

220 is a clock phase adjusting circuit that adjusts phases of the byte clock BCLK and the clock BCLK 1.

Figure 2:
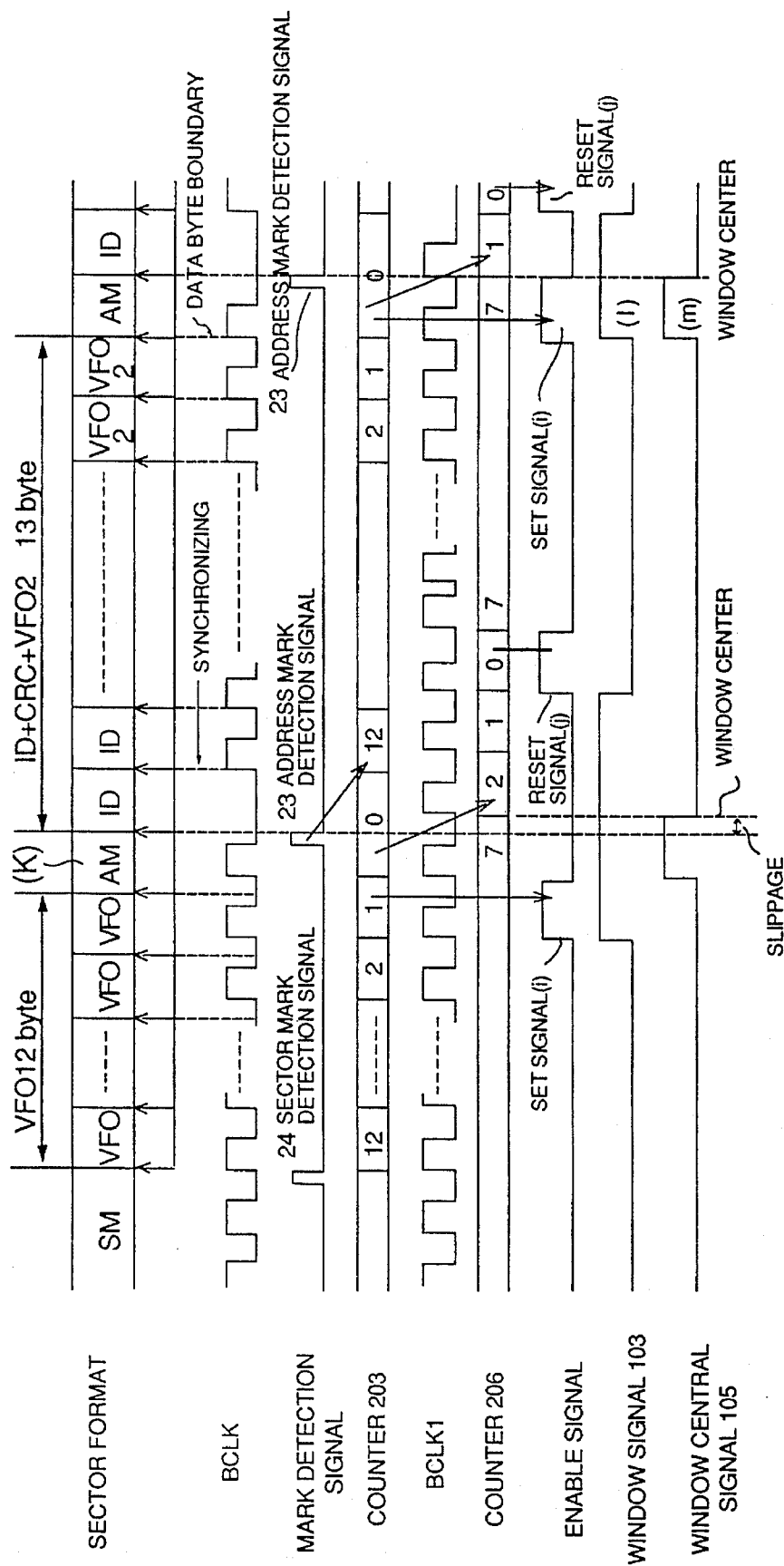
FIG. 2 is a timing chart showing an operation of the first embodiment.
Figure 3:
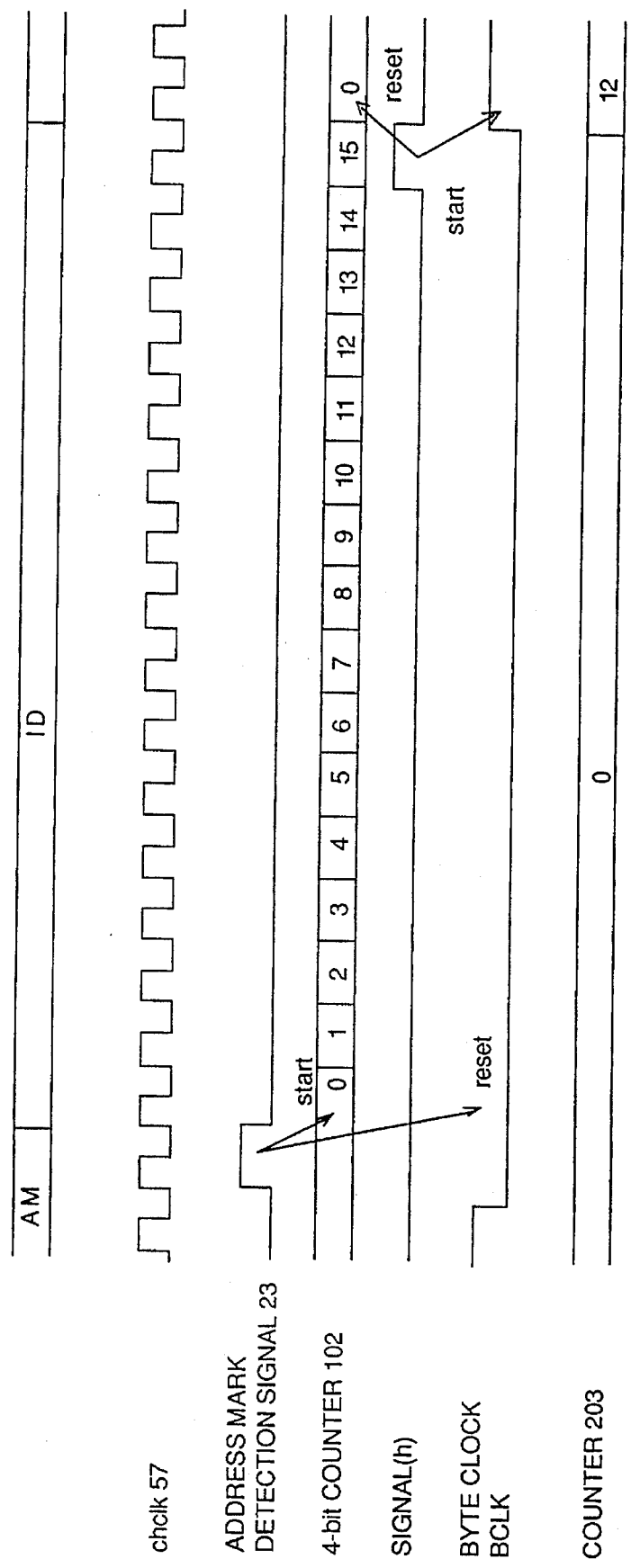
FIG. 3 is a timing chart showing an operation of the first embodiment.

FIG. 2 and FIG. 3 are timing charts showing operations of the first embodiment.

Next, FIG. 1, FIG. 2 and FIG. 3 are used to explain the first embodiment of the optical information control device by the present invention.

Figure 4:
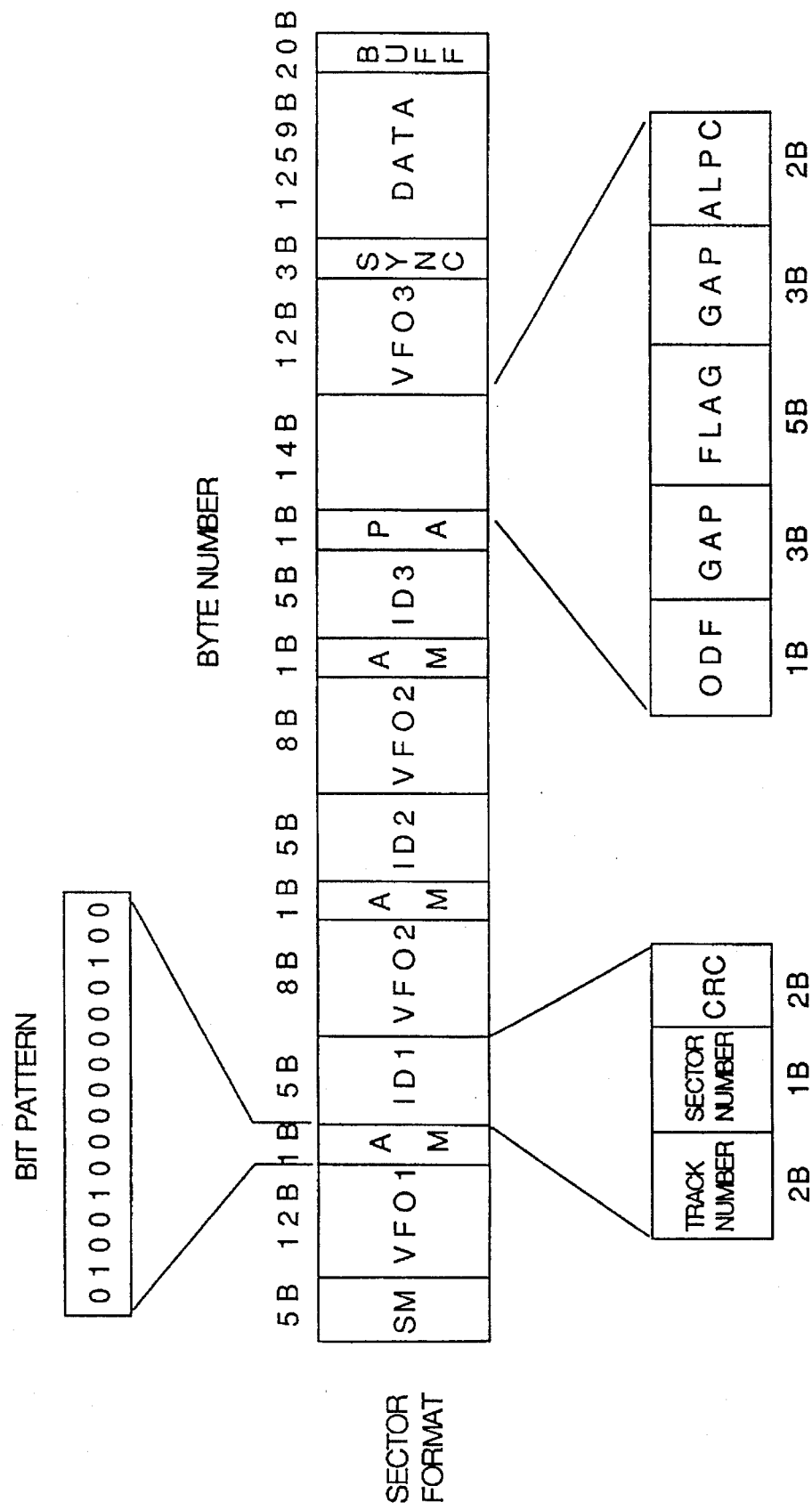
FIG. 4 is a sector format of an optical disk.

Here, the format in FIG. 4 is used in regard to sector formatting of an optical disk.

First is the operation of the servo system. This is the same as in the prior art example. Location of the optical head 2 is determined by the head amp 3, the error detection circuit 18, the servo circuit 16 and the actuator 15.

Next, reading operation of the optical disk drive is also the same as the prior art example, with reading at ID1–ID3 at the format control section 8, conducted using the address mark detection signal 23, which is the detection signal for address mark AM preceding ID1, ID2 and ID3, as trigger.

The resetting of the decoder 6 also uses the address mark detection signal 23 as a trigger.

Concerning decoder read clock, the rdclk 21, which is synchronous signal generated at PLL17 on the basis of VFO1–VFO3 output from the waveform shaping circuit, is used.

The address mark AM detection is also conducted the same as with the prior art example, in which pattern matching, etc. is conducted in the mark detection circuit 19.

However, because pattern length of the address mark AM is only 1 byte, sometimes patterns from areas other than the address mark AM are mistakenly detected.

Therefore, the window signal 103, which is a signal making the mark detection enabled for only a certain period beforehand, is used to generate the address mark detection signal 23.

All operations to this point are the same as in the prior art example.

Next, generation of the window signal 103 and the address mark detection signal 23 by the present invention is explained.

Where, the width of the first generated window signal 103 is ±2 bytes and then that of the second generated window signal 103 is ±1 byte. Because of this, the registers 202 and 209 are set "2" and "1" respectively.

In the generation of the window signal 103, the counters 203 is operated by the byte clock BCLK and the counters 206 is operated by the byte clock BCLK1.

The byte clock BCLK is generated by dividing the chclk 57 into 16 by the 16-frequency divider 208. Basically, it is synchronized with each data byte.

Also, when the chclk 57 is synchronized with PLL, it is the clock rdclk 21 synchronized with data pits (16 pits =1 byte), and when it is not synchronized with data pits, it becomes the clock rfclk 22 output from the crystal oscillator 211.

First, detection of the sector mark SM is conducted in the mark detection circuit 19, which comprises a pattern-matching circuit, etc. based on the pattern output from the waveform shaping circuit 4 in FIG. 14, and the sector mark detection signal 24 is output.

In FIG. 2, the value (=12) stored in the register 201 is selected by the selector 215 by the sector mark detection signal 24 and loaded into the counter 203. Then, the counter 203 is down-counted by the byte clock BCLK.

At the selector 216 the register 202 is selected and "2" is output from the selector 216.

When the value of the counter 203 becomes smaller (e.g., =1) than output (=2) of the selector 216 in accordance with comparison circuit 205, the set signal (i) is output.

And, at rising edge of the set signal (i), the window signal 103 is activated.

When the output of counter 203 becomes "0," the output "2" of the selector 216 is loaded into the counter 206 and the counter 206 is down-counted by the clock BCLK1, which is synchronized to the byte clock BCLK before stoppage of operation (the byte clock BCLK is stopped by address mark detection, as explained below).

When the output of the counter 203 becomes "0" a window central signal 105 is generated.

Continuously, when the output of the counter 206 becomes "0" a reset signal (j) is generated.

And, at an rising edge of the reset signal (j), the window signal 103 becomes inactive.

On the other hand, when the address mark AM is detected during the window signal 103 is active, the address mark detection signal 23 is output from the output enable circuit 52.

This address mark detection signal 23 resets the 16-frequency divider 208 through the logical sum 212, and the the byte clock BCLK is stopped.

Also, the address mark detection signal 23 causes the 4-bit counter 102 to begin count-up.

As shown in FIG. 3, the 4-bit counter 102 counts the chclk 57, and when the 4-bit counter output becomes "15" this is detected by the 15-value detector 101, the signal (h) is output and operation of the 2 208 is started again.

After the resumption of this operation, the value (=12) stored in the register 210 is downloaded into the counter 203 at a rising edge of the byte clock BCLK. Simultaneous to this, the 4-bit counter is reset.

In this way, the byte clock BCLK is stopped by the detection of the address mark, and data byte boundaries and the rising edge of the byte clock are synchronized by the resumption.

In other words, the data and the byte clock BCLK are synchronized. FIG. 2 and FIG. 3 are the timing charts showing this operation.

Next, the generation of the window signal 103 is explained.

First, the register 209 is selected and the output of selector 216 becomes "1".

Here, the counter 203 is down-counted by the byte clock BCLK.

And, the comparison circuit 205 outputs a set signal (i) when the value of the counter 203 becomes smaller the output (=1) of the selector 216, that is, the output of counter 203 becomes "0." The window signal 103 becomes active at a rising edge of the set signal (i).

When the output of counter 203 becomes "0," the output of selector 216, which is "1," is loaded into the counter 206 and the counter 206 down-counts using the clock BCLK1, which is synchronized to the byte clock BCLK before stoppage. (The byte clock BCLK is stopped by detection of the address mark, described as below.)

When the output of counter 206 becomes "0" the reset signal (j) is generated.

The window signal 103 (corresponding to the signal (l) in FIG. 2) is generated by the set signal (i) and the reset signal (j).

Also, when the output of counter 203 becomes "0," the window central signal 105 (corresponding to the signal (m) in FIG. 2) is generated.

In this way, by resetting the byte clock BCLK by the one immediately previous address mark detection signal 23 to synchronize data byte boundary and the byte clock BCLK, the influence of slippage between the byte clock BCLK and data byte boundary that occurs before detection of the address mark AM (corresponding to (k) in FIG. 2) on the generation of this window signal 103 (corresponding to the signal (l) in FIG. 2) and the window central signal 105 (corresponding to the signal (m) in FIG. 2) can be prevented.

Figure 5:
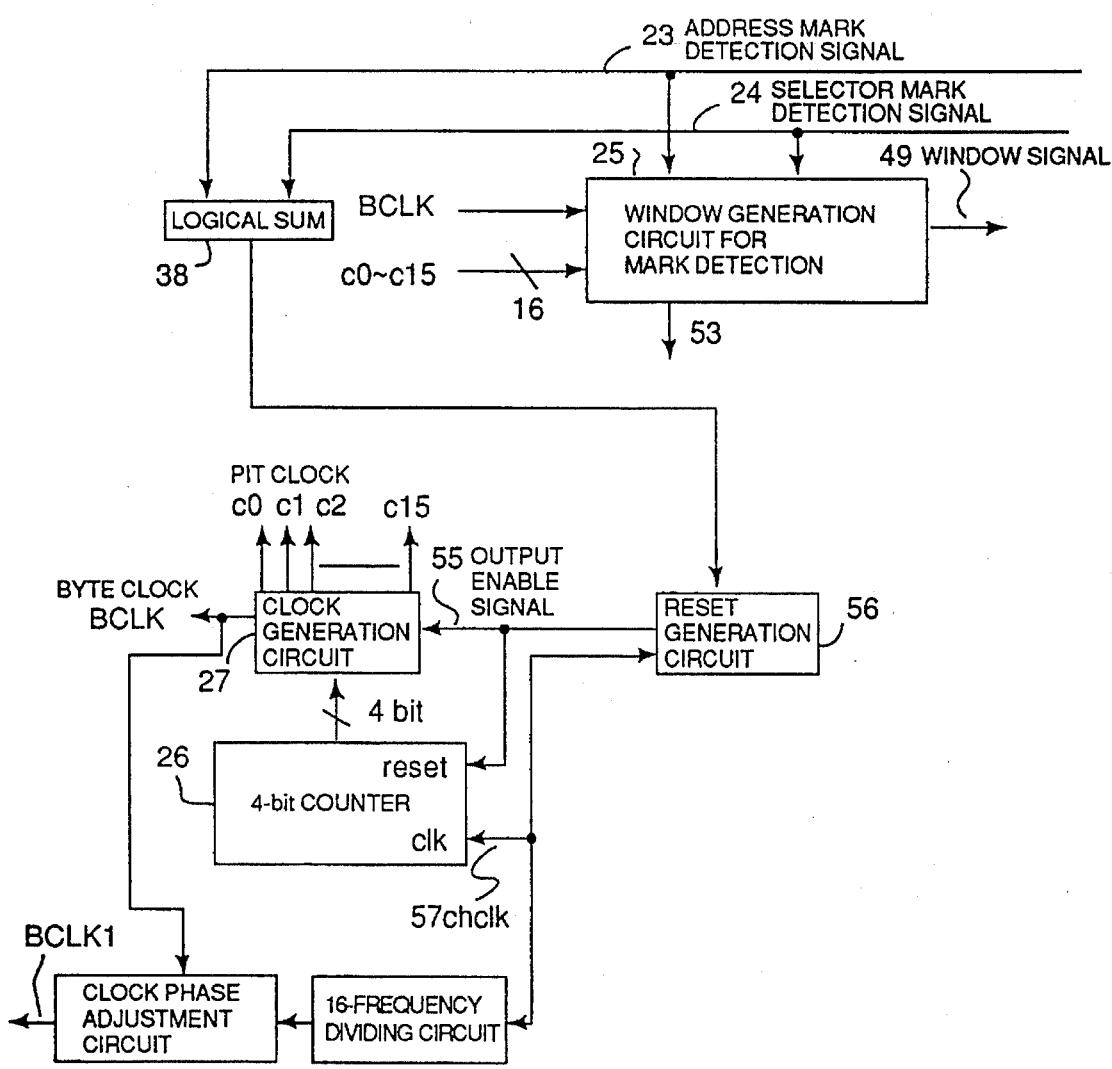
FIG. 5 is a block diagram of the second embodiment of the optical information control device by the present invention.

FIG. 5 is a block diagram of the second embodiment of the optical information control device by the present invention.

Where, explanation for the same components as the first embodiment is omitted.

In this figure, 25 is a window generation circuit for mark detection. This circuit generates a signal making address mark detection signal 23 and the sector mark detection signal 24 enable.

38 is a circuit for taking the logical sum of the address mark detection signal 23 and the sector mark detection signal 24.

55 is an output enable signal.

56 is a reset generation circuit.

26 is a 4-bit counter that counts the chclk 57, the output of selector 213, and is reset by the output enable signal 55.

27 is a clock generation circuit that inputs an output from the 4-bit counter 26, as shown in FIG. 5 and generates pit clocks c0–c15 and the byte clock BCLK.

49 is a window signal that is supplied to the output enable circuit 52.

53 is a window central signal.

Next, the window generation circuit 25 for mark detection is explained in detail.

Figure 6:
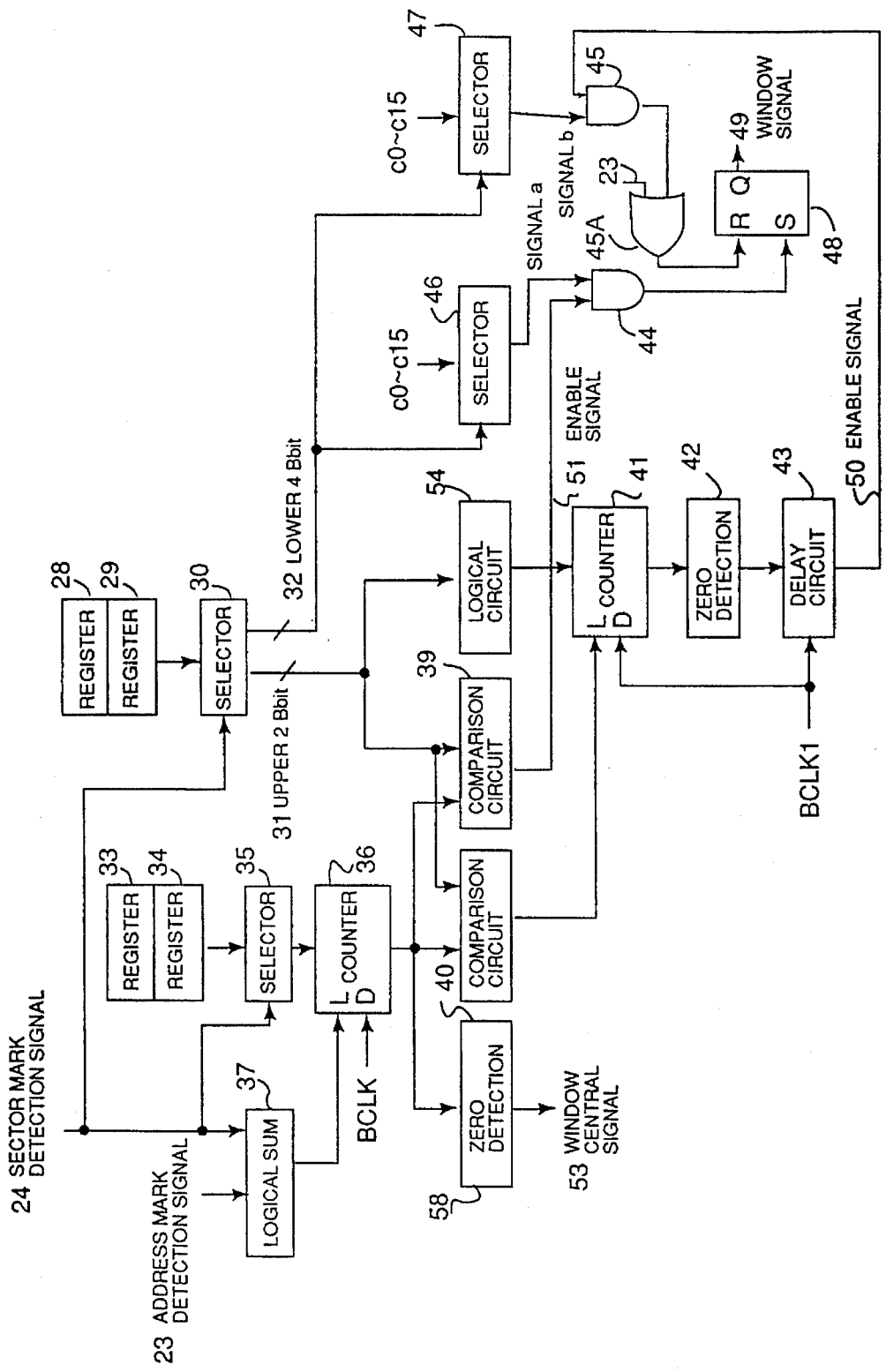
FIG. 6 is a block diagram of the window generation circuit for detecting marks of the second embodiment.

FIG. 6 is a block diagram of the window generation circuit 25 for mark detection.

In FIG. 6, 28, 29, 33 and 34 are registers.

30 is a selector for selecting outputs of registers 28 and 29.

31 shows the upper 2 bits of output of the selector 30.

32 is the lower 4 bits of output of the selector 30.

35 is a selector for selecting outputs of the registers 33 and 34.

36 is a counter.

37 is a logical sum.

39 is a comparison circuit whose output is activated when the output of counter 36 and the upper 2 bits 31 of the selector 30 become equal.

40 is a comparison circuit whose output becomes active when an output of the counter 36 reaches 1 value bigger than that of the upper 2 bits 31 of output of the selector 30.

54 is a logical circuit that outputs twice the output of the upper 2 bits 31 of the selector 30.

41 is a counter that is loaded by an output signal of the logical circuit 54 and an output signal of comparison circuit 40 and begins counting.

42 is a zero detection circuit that detects the event that the output of counter 41 becomes "0".

43 is a delay circuit.

44 and 45 are AND gates.

45A is a logical sum of an output signal of the AND gate 45 and an address mark detection signal.

46 and 47 are selectors that select and output 1 channel clock from channel clocks c0–c15.

48 is an RS flip-flop.

49 is a window signal that is the same as that in FIG. 5.

50 and 51 are enable signals.

Next, an operation of the second embodiment of the optical information control device having above configuration.

In FIG. 5, the chclk 57 output from the selector 213 is the clock rdclk 21, in synchronization with data pits (16 pits =1 byte) when synchronization with PLL is established. When it is not established, it becomes the clock rfclk 22 output from the crystal oscillator 211.

Also, the 4-bit counter 26 is counted up by the chclk 57.

Figure 7:
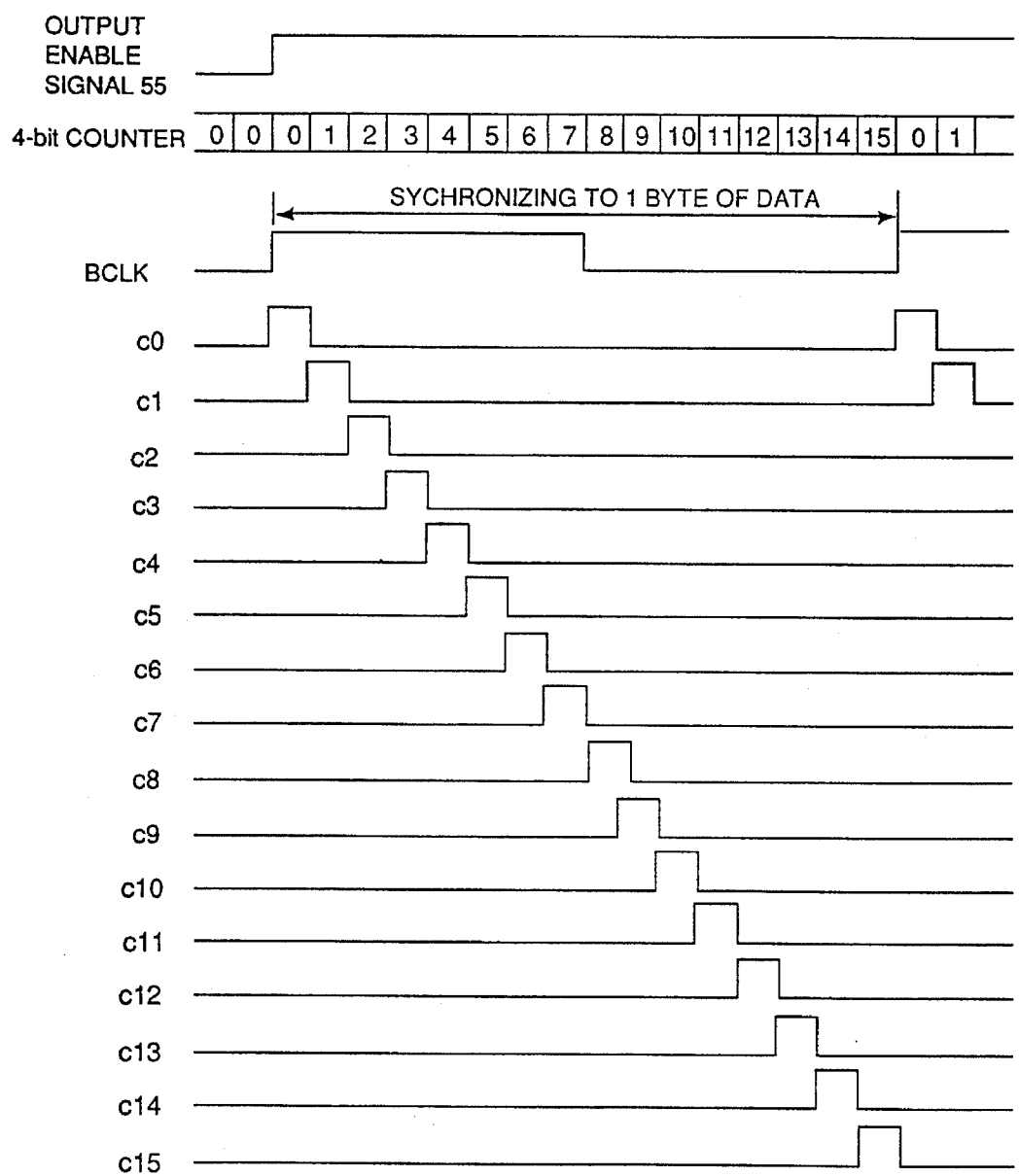
FIG. 7 is a timing chart showing a relationship between input and output signals of a clock generation circuit.

Bit clocks c0–c15 and the byte clock BCLK are generated by the clock generation circuit 27 with the output of 4-bit counter 26 and the output enable signal 55. This is illustrated in FIG. 7.

The reset generation circuit 56 puts the output enable signal 55 at a low level during the time when the 16 clocks of the chclk 57 are being tabulated by input of the address mark detection signal 23 or input of the sector mark detection signal 24.

Next is an explanation of generation of the window signal 49 and the window central signal 53.

Figure 8:
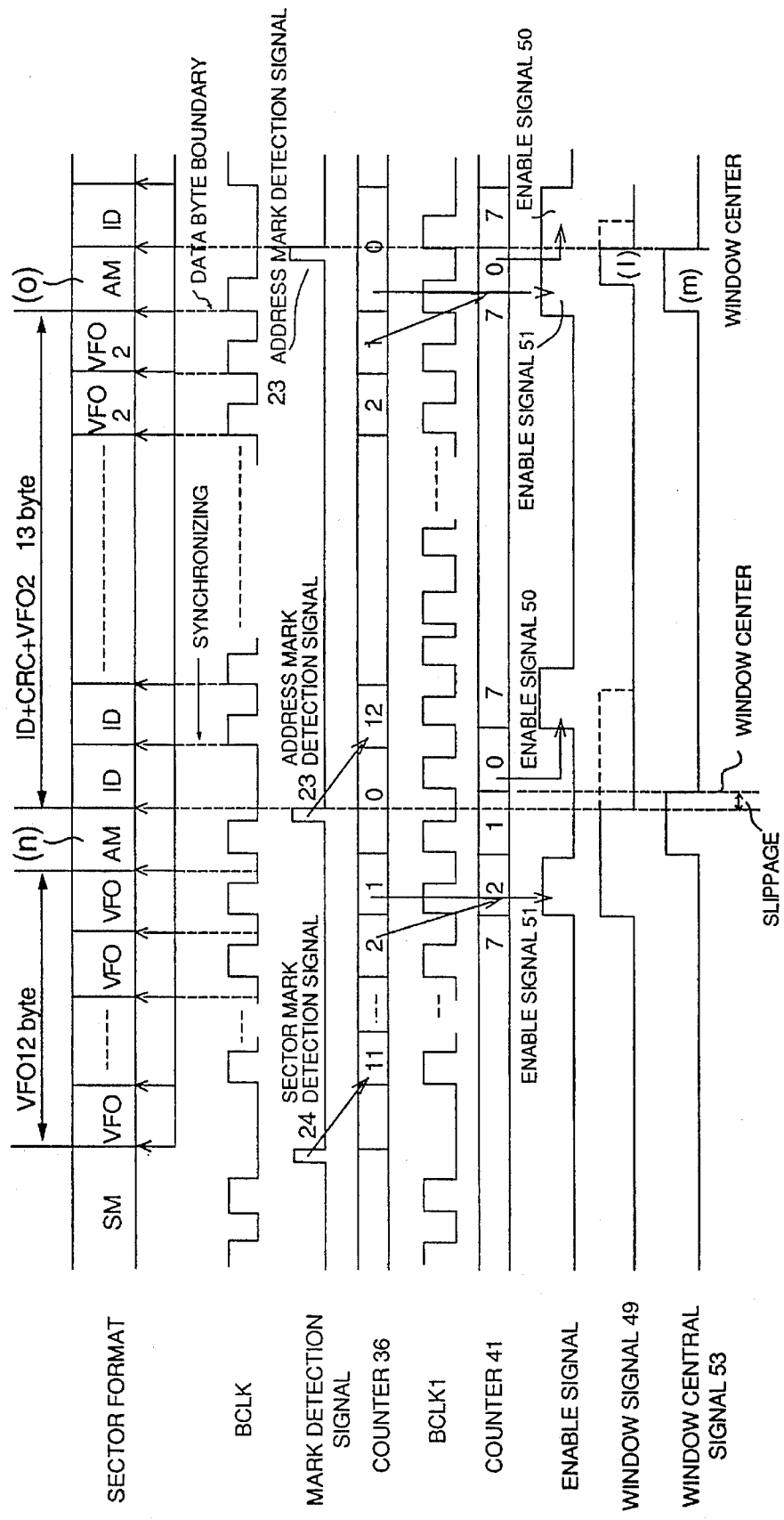
FIG. 8 is a timing chart showing an operation of the second embodiment.

Here, the window signal width of the window signal 49 for detecting the first address mark AM (corresponding to (n) in FIG. 8) is set at ±(1 byte +8 channel bits) and the window signal width of the window signal 49 for detecting of the second address mark AM (corresponding to (o) in FIG. 8) is set at ±4 channel bits.

Figure 12:
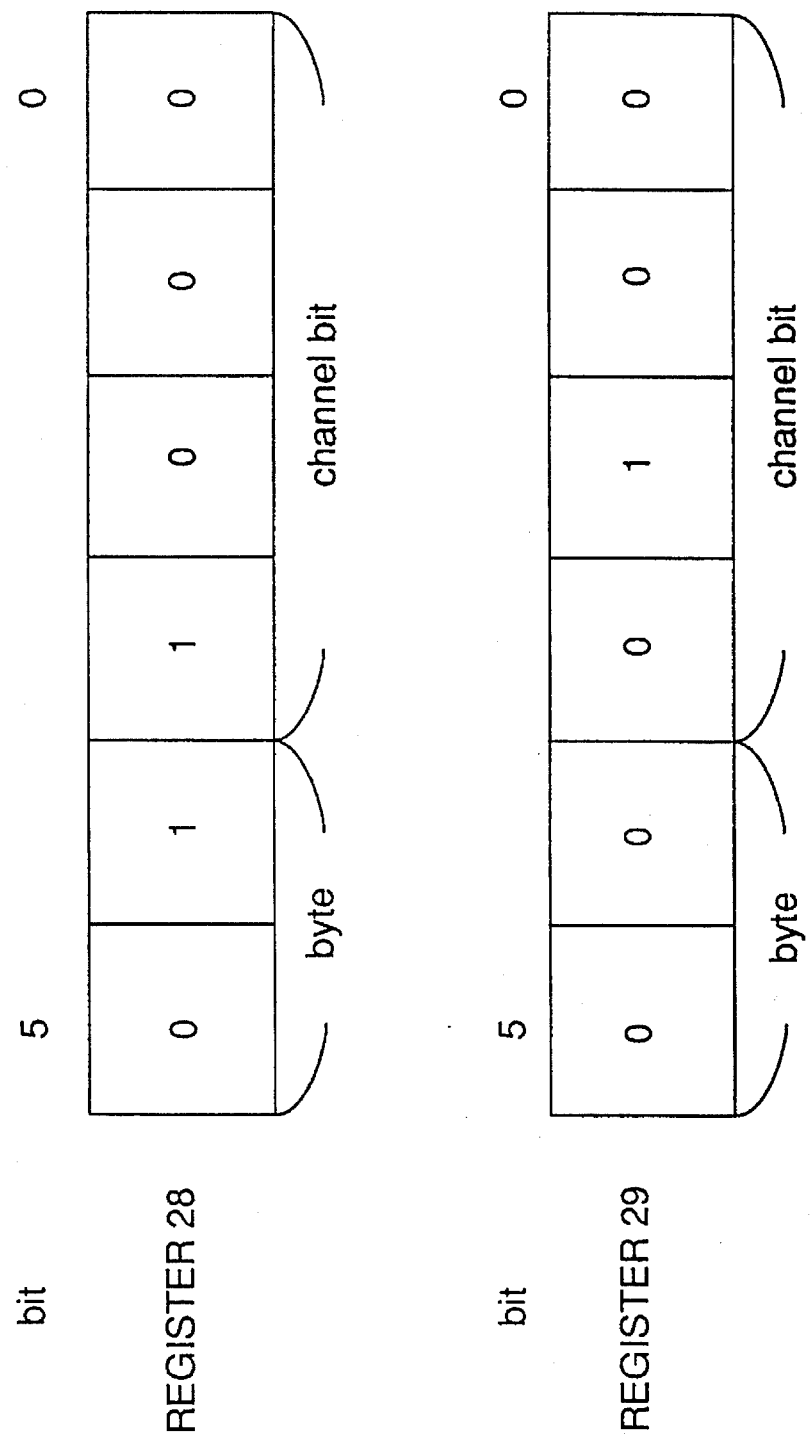
FIG. 12 is a figure showing contents of bits of the register 28 and 29.

For this reason, the values shown in FIG. 12 are set at registers 28 and 29 to set window width.

Here, for the upper 2 bits, window width is set in units of bytes, and for the lower 4 bits, window width is set in units of channel bits. In other words, the value of 01 (=1) is set for the upper 2 bits and 1000 (=8) is set for the lower 4 bits of the resistor 28, and 00 (=0) is set for the upper 2 bits and 0100 (=4) for the lower 4 bits of the resistor 29.

First, detection of the sector mark SM is conducted at the mark detection circuit 19, which comprises a pattern matching circuit, etc. from a pattern output from waveform shaping circuit 4, and the sector mark detection signal 24 is output.

In FIG. 5, the output enable signal 55 is fixed at a low level in the reset generation circuit 56 by the output from the logical sum 38.

And the clock generation circuit 27 is stopped, and the 4-bit counter 26 is reset.

Figure 11:
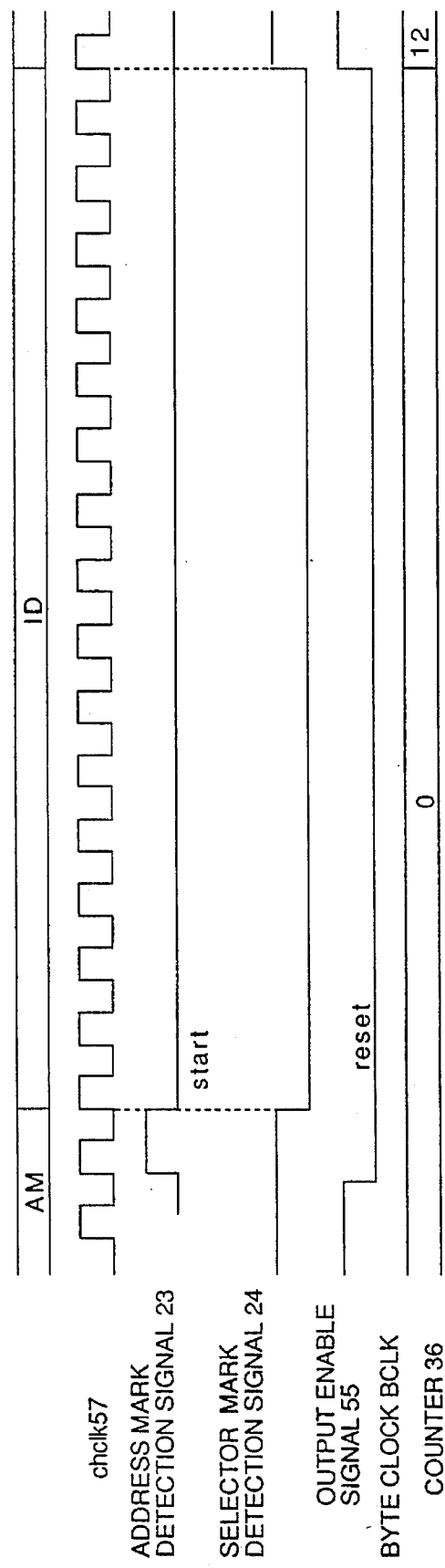
FIG. 11 is a timing chart showing an operation of the reset generation circuit.

With this, during the period in which the output enable signal 55 is at a low level, channel clocks c0–c15 and the byte clock BCLK are not output as shown in FIG. 7 and FIG. 11.

Because the output enable signal 55 becomes high-level, 1 byte after detection of the sector mark SM, the byte clock BCLK is resumed and generation of channel clocks c0–c15 begins again.

At this time, the byte clock BCLK and 1 byte of data synchronize.

Next, as shown in FIG. 6 and FIG. 8, the value (=11) stored in the register 33 is selected by the selector 35 at the point where the byte clock BCLK resumed, is stored in the counter 36 and down-loaded by the byte clock BCLK.

Also at the selector 30, output of the register 28 is selected and "01" which is the upper 2 bits 31 is input into the comparison circuits 39 and 40.

When the value of the counter 36 becomes "1" (the value of the upper 2 bits 31), the enable signal 51 is output from the comparison circuit 39.

When the value of the counter 36 becomes "2," (the value greater by 1 than the upper 2 bits 31), a signal loaded in the comparison circuit 40 is output.

And the output "2" (twice the value of upper 2 bits 31) of logical circuit 54 is loaded into the counter 41 and then the counter 41 is down-counted by the clock BCLK1, which is synchronized to the byte clock BCLK, before stoppage (the byte clock BCLK is stopped by detection of an address mark).

When value of the counter 41 becomes "0," output of the zero detector 42 is activated. A signal that delays this output by 1 clock of BCLK1 becomes the enable signal 50.

At selectors 46 and 47, one signal each from c0–c15 are selected as signals a and b, as shown in tables in FIG. 13. In this case, C7 is selected as the signal a and C8, as the signal b.

Figure 9:
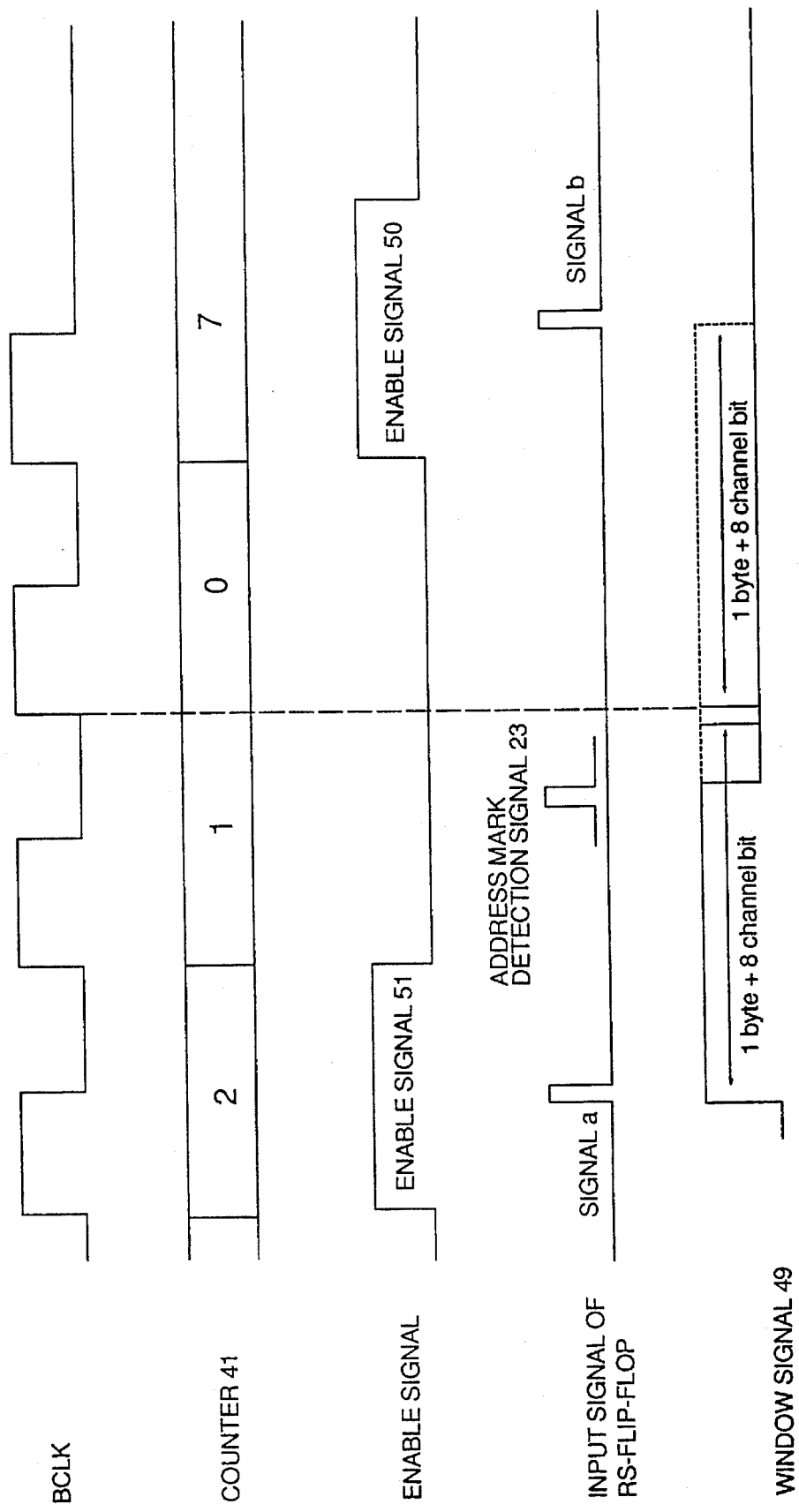
FIG. 9 is a timing chart showing an operation of the second embodiment.

As a result, the window signal 49 is generated from the enable signals 50 and 51 and signals a and b. This is shown in FIG. 8 and FIG. 9.

The address mark detection signal 23 is input to the RS flip-flop 48 via the OR gate 45A. As indicated by the solid line in the timing chart, the RS-flip-flop 48 is reset by the address mark detection signal 23 and inactivates the window signal 49. This is to prevent mistaken detection of 2 address marks AM.

If there is no detection of an address mark AM, the window signal 49 becomes inactive at the end of the dotted line.

When output of the counter 36 becomes "0," the window central signal 53 is output from the zero detector 58.

On the other hand, the output enable signal 55 is fixed at a low level in the reset generation circuit 56 as mentioned above by the address mark detection signal 23, which is from detection of the address mark AM (corresponding to (n) in FIG. 8) and 4-bit counter 26 is reset.

By this, during the period that the output enable signal 55 is at a low level, the output of channel clocks c0–c15 and the byte clock BCLK are stopped.

However, because the output enable signal 55 becomes high level 1 byte after detection of address mark AM, generation of byte clock BCLK and channel clocks c0–c15 resumes.

From this, the rising edge of the byte clock BCLK and data byte boundary are synchronized. Thus, the byte clock BCLK and 1 byte of data are synchronized.

At the point where the byte clock BCLK resumes, the value (=12) stored in the resistor 34 is selected by the selector 35, and loaded into the counter 36 and the counter 36 down-counts using the byte clock BCLK.

At the selector 30, output of the resistor 29 is selected and "00" that is the upper 2 bits 31 is input to the comparison circuits 39 and 40.

When the value of counter 36 becomes "0" (value of the upper 2 bits 31), the enable signal 51 is output from the comparison circuit 39.

When the value of the counter 36 becomes "1" (a value 1 greater than the upper 2 bits 31), "0" (a value twice that of upper 2 bits 31) that is an output of the logical circuit 54 is loaded into the counter 41 and the counter 41 down-counts using the clock BCLK1, which is synchronized to the byte clock BCLK before stoppage.

When the value of counter 41 becomes "0," the output of zero detector 42 is activated. The signal that delayed this output by 1 clock of the BCLK1, becomes the enable signal 50.

At the selectors 46 and 47, one signal each from c1 to c15, in accordance with tables in FIG. 13 are selected as signals a and b. Because the register 29 is selected, c11 is selected as the signal a and c4 is selected as the signal b.

Figure 10:
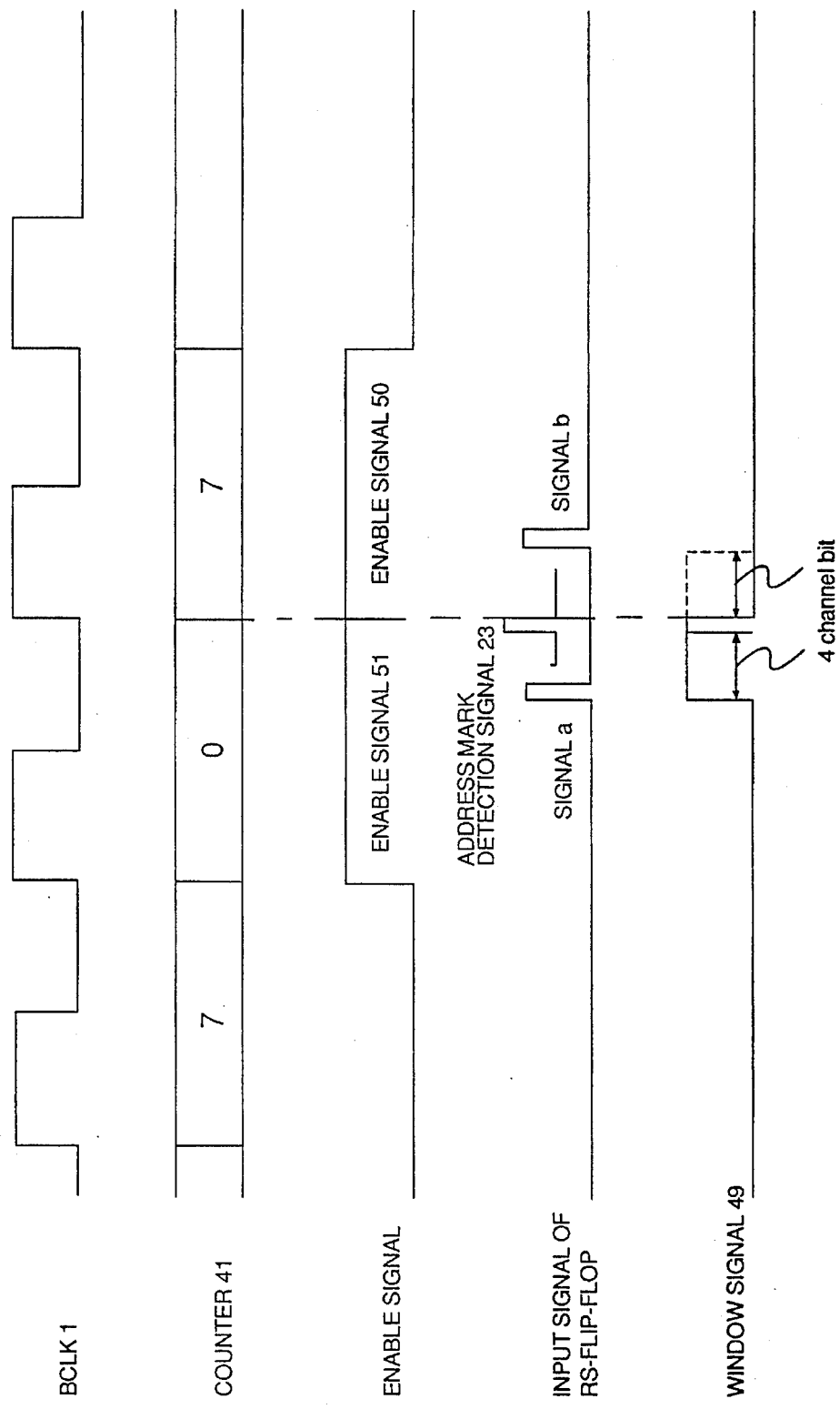
FIG. 10 is a timing chart showing an operation of the second embodiment.

As a result, the window signal 49 is generated by the enable signals 50 and 51 and signals a and b (see FIG. 8 and FIG. 10).

When output of the counter 36 becomes "0," the window central signal 53 is output from the zero detector 58.

In this way, by synchronizing the byte clock BCLK and data byte boundaries, it can be avoided that slippage between the byte clock BCLK and data byte boundary influences the generation location of the window signal and the window central signal for detecting a next address mark.

This embodiment covers an address mark. It can be used for estimation of the location of window signals for detection of SYNC, RESYNC or other special marks on optical disks or clusters of these marks.

By using c0–c15 channel clocks, it is possible to set window width in units of pits.

What is claimed is:

1. An optical information control device comprising:
   a mark detection means for detecting marks recorded at even intervals in tracks of an optical disk and outputting a mark detection signal; and
   a reference clock generation means for stopping generation of said reference clock when having received said mark detection signal and re-generating said reference clock after a pre-set time from stoppage of generation of said reference clock, then synchronizing said reference clock with byte boundaries of data recorded on said optical disk.

2. The optical information control device of claim 1, wherein said reference clock generation means comprises:
   a frequency dividing means for generating said reference clock by dividing a pit clock and stopping operation when having received said mark detection signal; and
   a resumption means for resuming said frequency dividing means after said pre-set time from input of said mark detection signal.

3. The optical information control device of claim 2, wherein said pit clock comprises a clock synchronized with said pits of the optical disk.

4. The optical information control device of claim 2, wherein said pit clock comprises a clock made of data recorded in said optical disk.

5. The optical information control device of claim 2, wherein said pit clock comprises a clock generated by a pit clock generation means provided in the device.

6. The optical information control device of claim 2, wherein said resumption means comprises:
   a first counter circuit for counting said pit clock when having received said mark detection signal; and
   a first detection circuit for detecting the event of arrival of counted number of said first counter circuit to a pre-set number.

7. The optical information control device of claim 1, further comprising a window signal generation means for generating a window signal that makes said mark detection signal enable based on said reference clock.

8. The optical information control device of claim 7, wherein said window signal generation signal comprises:
   a second counter circuit for counting said reference clock;
   a second detection circuit for detecting the event of arrival of a counted number of said second counter circuit to a pre-set number and outputting a set signal;

a synchronous clock generation means for generating a synchronous clock synchronized with a phase of said reference clock;

a third counter circuit for counting said synchronous clock when the counted number of said second counter circuit has arrived to a pre-set number and outputting a set signal;

a third detection circuit for detecting the event of arrival of the counted number of said third counter circuit to a pre-set number and outputting a reset signal; and a window signal generation circuit for generating said window signal by making a signal active by input of said set signal and making said signal inactive by input of said reset signal.

9. The optical information control device of claim 7, comprising:

a multi-phase clock generation means for generating a multi-phase clock synchronized with said pit clock, stopping generation of said multi-phase clock when having received said mark detection signal, resuming generation of said multi-phase clock after pre-set time from stoppage of generation of said multi-phase clock, then synchronizing said multi-phase clock with pits of said optical disk;

wherein said optical information control device is configured so as to adjust generation of said window signal in pit unit using said reference signal and said multi-phase clock.

10. A An optical information control device comprising:

a mark detection means for detecting a mark recorded at even intervals in a track on an optical disk and generating a mark detection signal;

a clock generation means for generating a preset multi-phase clock synchronized to said reference clock and said pit clock using said pit clock, stopping generation of said multi-phase clock and said reference clock when having received said mark detection signal, resuming generation of said multi-phase clock and said reference clock after pre-set time from the stoppage of generation, and synchronizing the phase of said reference clock to a byte boundary of said data recorded on said optical disk and synchronizing said multi-phase clock to pits on said optical disk; and a window signal generation means for adjusting generation of a window signal that makes said mark detection signal enabled in pit units using said multi-phase clock and said reference clock.

11. The optical information control device of claim 10, wherein said pit clock comprises a clock synchronized to a pit on said optical disk.

12. The optical information control device of claim 10, wherein said pit clock comprises a byte of said data recorded on said optical disk.

13. The optical information control device of claim 10, wherein said pit clock comprises a clock generated by a pit clock generation means provided in the device.

14. The optical information control device of claim 10, wherein said clock generation means comprises:

a clock generation circuit for generating a reference clock from said pit clock and generating a multi-phase clock synchronizing to said pit clock; and a resumption means for stopping clock generation of said clock generation circuit and starting to count said pit clock when having received said mark detection signal, and resuming said clock generation circuit when the counted number has reached a preset number.

15. The optical information control device of claim 14, wherein said clock generation circuit comprises:

a counter circuit for counting said pit clock;

a multi-phase clock generation circuit for synchronizing to said pit clock in accordance with an output value of said counter circuit, and generating a plurality of multi-phase clocks having different phases from others; and a frequency dividing circuit for generating said reference clock by dividing said pit clock.

16. The optical information control device of claim 14, wherein said clock generation circuit comprises:

a synchronous clock generation circuit for generating a synchronous clock synchronizing to said reference clock; and said window signal generation means comprises:

a first counting means for counting said reference clock and outputting first signal when the counted number has reached a preset number;

a selection means for selecting a first multi-phase clock and a second multi-phase clock from said plurality of multi-phase clocks;

a means for outputting said second signal, in synchronizing to said first multi-phase clock;

a means for outputting a set signal when having received said second signal, by latching said first signal;

a means for counting said synchronous clock when the counted number of said first counting means has reached a preset number and outputting a third signal when the counted number has reached to a preset number;

a means for outputting a fourth signal, in synchronizing to said second multi-phase clock;

a means for latching said third signal and outputting a reset signal when having received said fourth signal; and a window signal generation circuit for activating a signal by input of said set signal, inactivating said signal by input of said reset signal, then generating said window signal.

17. A synchronization method of an optical information control device synchronizing a reference clock to byte boundary of data recorded on an optical disk, comprising:

(A) step of detecting a mark recorded at even intervals in a track on said optical disk and generating a mark detection signal; and (B) step of synchronizing said reference clock to the byte boundary of said data recorded on said optical disk by resuming generation of said reference clock after a preset time from the stoppage.

18. A synchronization method of an optical information control device of claim 17, wherein said (B) step comprises:

a step of generating said reference clock by dividing a pit clock;

a step of stopping generation of said reference clock when having received said mark detection signal; and a step of counting said pit clock when having received said mark detection signal and resuming generation of said reference clock when the counted number has reached a preset number.

19. The synchronization method of an optical information control device of claim 18, wherein said pit clock comprises a clock synchronizing to a pit of said optical disk.

* * * * *